United States Patent [19]

Wagstaffe

[11] 4,259,386

[45] Mar. 31, 1981

[54] FLEXIBLE WALLCOVERINGS

[75] Inventor: Eric C. Wagstaffe, Wilmslow, England

[73] Assignee: Reed International Limited, London, England

[21] Appl. No.: 144,827

[22] Filed: Apr. 29, 1980

[51] Int. Cl.³ .............................................. B32B 5/18
[52] U.S. Cl. .................................. 428/159; 427/267; 427/373; 428/211; 428/314; 428/326
[58] Field of Search .............. 428/158, 159, 160, 211, 428/314, 326; 427/202, 373, 267

[56] References Cited

U.S. PATENT DOCUMENTS

| | | | |
|---|---|---|---|
| 3,061,475 | 10/1962 | Wallace | 428/314 |
| 3,675,245 | 7/1972 | Follett | 428/304 |
| 3,790,421 | 2/1974 | Habgood, Jr. | 428/326 |
| 3,931,429 | 1/1976 | Austin | 428/159 |
| 4,007,071 | 2/1977 | Addie et al. | 428/161 |
| 4,136,215 | 1/1979 | Den Otter et al. | 428/308 |
| 4,162,342 | 7/1979 | Schwartz | 428/310 |

*Primary Examiner*—William J. Van Balen
*Attorney, Agent, or Firm*—Larson, Taylor and Hinds

[57] ABSTRACT

A flexible wallcovering is made by applying a foamable composition (13) to a woodchip paper (12, 14) having woodchips defining a relief surface on the paper by a screen printing process and then foaming the composition. Preferably, the wallcovering is of two ply construction with a woodchip content between the plies and the paper is formulated so that the upper ply is dry removable from the lower ply. The woodchips are at least 2 mm in average length; and the woodchips form 20 to 35% by weight of the paper.

8 Claims, 4 Drawing Figures

FLEXIBLE WALLCOVERINGS

FIELD OF THE INVENTION

This invention relates to flexible wallcoverings and in particular to such wallcoverings (by which term we also include ceiling coverings) having a relief or texture effect.

DESCRIPTION OF THE PRIOR ART

It has been proposed to obtain a relief or texture effect by coating a substrate, normally of a cellulosic nature, e.g. paper, with a foamable plastic composition, either as a continuous coating or as a discontinuous coating, for example by printing, and then effecting foaming of the foamable composition. In order to obtain a relief or texture effect on such a coated substrate, particularly where the foamable composition is applied as a continuous coating, it has been necessary to emboss either the substrate prior to coating or to emboss the foam. The latter may be accomplished mechanically, for example by passing the coated substrate, either simultaneously with, or after, foaming between an embossing roller and a backing roller. Alternatively the foam may be embossed chemically, for example by application of an ink composition that activates or inhibites foaming of the foamable composition to selected areas of the coated substrate, e.g. by printing, prior to foaming.

SUMMARY OF THE INVENTION

It is one object of the present invention to provide an alternative method of achieving a relief or textured finish on flexible wallcoverings.

It is a further object of the present invention to provide wallcoverings which have a relief or textured finish but which are also peelable.

It is a yet further object of the present invention to provide a wallpaper formed from a substrate and a foamed coating in which the foam coating is bulkier than previously obtained.

The above objects may be realised, according to the present invention, by making a flexible wallcovering comprising a woodchip paper substrate having a continuous or discontinuous coating of a foamed thermoplastic polymeric composition thereon.

We also provide a method of making a wallcovering comprising applying a foamable thermoplastic polymeric composition either as a continuous or as a discontinuous coating to a substrate comprising a woodchip paper and thereafter foaming the polymeric composition.

Woodchip papers, otherwise known as wood ingrain papers, are well known and are used themselves as wall or ceiling coverings. Generally they comprise a laminate of two paper plies or furnishes, which may be the same or different, with chips of wood or sawdust randomly dispersed therebetween. The laminate may be made by laminating two preformed paper plies with the woodchips or sawdust interposed or it may be made directly in the paper making process as a twin furnish paper. Other form of woodchip paper comprise a single paper ply having woodchips distributed therein during the paper making process, or a paper having woodchips adhesively bonded to its surface. Any of these types of woodchip paper may be used in the present invention.

The woodchip paper preferably contain 20 to 35% by weight of woodchips, which are preferably in the form of elongated silvers of wood having an average maximum dimension of at least 2 mm. Preferably the average maximum dimension is less than 2 cm. The average length of the woodchips is preferably at least twice the average width and thickness.

The coating of the thermoplastic polymeric material may be applied in liquid or powdered or particulate form, following by heating or drying, as necessary, to give an adherent coating.

The coating is preferably applied in liquid form. Thus it may be in the form of a dispersion or solution of the polymer in a liquid such as water or an organic solvent, which liquid is removed, after application of the coating, by heating or merely, in the case of a volatile organic liquid, by volatilisation at the ambient temperature.

Preferably the liquid coating is a plastisol, i.e. a dispersion of the polymeric material in a plasticiser therefor, which is converted to the solid state by heating to effect gelation.

Examples of suitable thermoplastic polymeric materials that may be used include polymers or copolymers of at least one ethylenically unsaturated monomeric material selected from olefins, for example ethylene, propylene, butene, isobutene; vinyl chloride; vinyl esters, for example vinyl acetate; vinylidene chloride; vinyl ethers; acrylonitrile; esters of acrylic or methacrylic acids, for example methylacrylate, ethyl acrylate, butyl acrylate, and methyl methacrylate; acrylic or methacrylic acids; styrene; butadiene; and isobutylene.

Other polymers that may be used include thermoplastic cellulosic polymers such as cellulose acetate and cellulose nitrate. Mixtures of polymers may be used.

Preferred thermoplastic polymeric materials include homopolymers of vinyl chloride and copolymers of vinyl chloride with comonomers such as vinyl acetate, vinyl ethers, vinylidene chloride and olefins; copolymers of esters of acrylic of methacrylic acids; and cellulose nitrate. Vinyl chloride homo and copolymers are particularly preferred.

In order to render the thermoplastic polymeric material foamable, the composition should contain one or more heat decomposable blowing agents. Examples of suitable blowing agents include
azodicarbonamide
p-toluenesulphonylhydrazide
benzenesulphonylhydrazide
diphenylsulphone-3,3'-disulphonylhydrazide
p,p'-oxybis(benzenesulphonylhydrazide)
p-toluenesulphonylsemicarbazide
p,p'-oxybis(benzenesulphonylsemicarbazide)
azodiisobutyronitrile
N,N'-dinitrosopentamethylenetetramine
N,N'-dimethyl-N,N'-dinitrosoterephthalamide
5-morpholyl-1,2,3,4-thiatriazole
diazoaminobenzene
ammonium carbonate and bicarbonate
sodium bicarbonate Mixtures of blowing agents may be employed.

Additives that modify the decomposition temperature of the blowing agent may be incorporated into the composition. Examples of such additives include activators, for example inorganic or organic, salts of zinc, cadmium, or lead, particularly salts of such metals with fatty acids, such as octanoic acid. Alternatively additives that inhibit decomposition of the blowing agent may be incorporated. Inter alia, certain barium and tin salts act as inhibitors.

The coating composition preferably contains 0.5 to 15%, particularly 1 to 10%, by weight of blowing agent, based on the weight of the polymeric material in the coating composition. In addition the coating composition may also contain additives such as pigments or fillers. In those areas to which it is applied, the coating composition is preferably applied at a rate such that there is 40 to 700 g, particularly above 90 g of binder material per square meter of substrate. By the term binder material we mean the non-volatile components of the composition that, on heating, coalesce to form an integrated film. In computing the quantity of binder material, any inorganic non film forming ingredients such as fillers and pigments are excluded.

The present invention has particular merit when the woodchip paper substrate is such that the woodchips impart a noticeable relief surface and the composition to be foamed is applied to that surface by a rotary screen printing process.

Where the composition is applied discontinuously, such as with a patterned wallcovering, it is preferred that the substrate is provided with a coating protective against discolouration during the foaming process and during the lifetime of the wallcovering. Such a coating may be a pigment dispersed in a polymeric binder or it could be an inked printed pattern on which the foam is superimposed.

After application of the foamable coating it is dried or fused to form a gelled coating and then heated to effect foaming. Prior to foaming, the substrate bearing the coating of the foamable composition may be printed. If desired the ink used for such printing may contain a material which modifies the decomposition temperature of the blowing agent in the foamable composition, for example, as described in U.K. Pat. No. 1,069,998 or 1,147,983. If desired, as described in our U.K. Pat. No. 1,458,397, in order to improve the wet adhesion of such an ink, a coating of a solvent containing material e.g. a lacquer, may be applied to the coating of the foamable composition before application of the ink.

Additionally, or alternatively, a wear layer of transparent polymeric composition, e.g. an unpigmented vinyl plastisol, may be applied. Where, after application of the foamable coating, the substrate is printed, whether with an ink containing a compound that modifies the decomposition temperature of the blowing agent or simply with a decorative ink, the wear layer, if used, should be applied after application of the ink. The coating compositions may contain other conventional ingredients, e.g. pigments, dyes, fillers, extenders, plasticisers, stabilisers, and viscosity modifiers.

The invention is illustrated by the following Examples taken with the accompanying drawings.

EXAMPLE I (FIG. 1)

Figure 1:
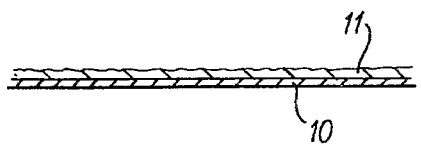
FIG. 1 is a cross-sectional view of a piece of wallcovering made, according to the known art, by screen printing a foamable composition on a plain base web and then causing it to foam (as in Example I below).

FIG. 1 shows a paper substrate 10 devoid of relief defined by woodchips. On to this has been coated, at 65 g/m² of binder material, a foamable composition of vinyl chloride polymer plastisol having the following formulation.

|  |  | parts |  |
|---|---|---|---|
| paste grade vinyl chloride homopolymer |  | 100 | |
| dicaprylphthalate | (plasticiser) | 55.5 | |
|  |  |  | binder material |
| epoxidised oil | (stabiliser) | 3 | |
| viscosity depressant |  | 3 | |
| titanium dioxide | (pigment) | 21 | |
| cadmium/zinc octoate | (activator) | 4 | |
| azodicarbonamide | (blowing agent) | 5.5 | |

The plastisol was rotary pattern screen printed onto the substrate 10.

The screen printer used was a Stork Rotary Screen Printing Press Model PD.790. The gap between the counter roller of the press and the dummy screen of the press was 0.15 mm. The counter roller height was zero. The squeegee was set at 40° @ 15 pressure. The speed of print was 12.2 meters/minute.

After printing the plastisol was foamed by heating for 60 seconds at 200° C. The overall thickness of the foam 11 so generated was about 0.53 mm. The appearance of the foam 11 was low relief textured and leather-like with a fair degree of uniformity but there was no superimposed texture.

If an attempt is made to apply a heavier coating of plastisol then, in the case of a discontinuous or patterned coating, the pattern tends to lose its definition.

EXAMPLE II (FIG. 2)

Figure 2:
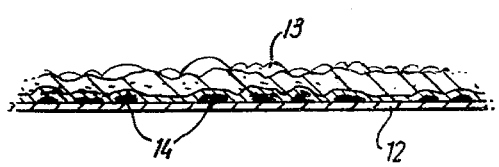
FIG. 2 is a cross sectional view of a piece of wallcovering made, according to the invention, by screen printing a foamable composition on to a relief surface woodchip base web, and causing it to foam, (as in Example II below) and is to the same scale as FIG. 1.
Figure 3:
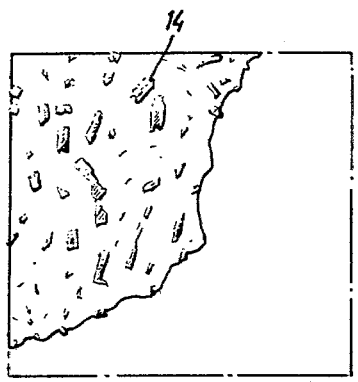
FIG. 3 illustrates the woodchip face of base web of FIG. 2.
Figure 4:
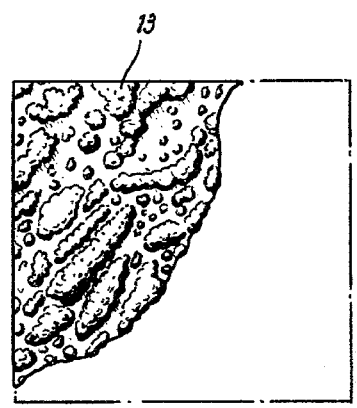
FIG. 4 illustrates the foam face of the finished wallcovering according to the invention.

FIG. 2 shows a paper substrate 12 having a surface relief defined by woodchips 14. On to this has been coated, at 290 g/m² of binder material, the foamable composition described with reference to Example I. The substrate included 31% by weight of woodchips having an average length of 7 mm and an average width and thickness of 1.8 mm. The plastisol was rotary screen pattern printed on to the substrate 10 through a 40 mesh screen as in Example I.

After printing with plastisol the coating was gelled and foamed by heating for 60 seconds in an oven maintained at 200° C. to generate a foamed composition layer 13 which had an attractive relief texture superimposed on the printed pattern.

EXAMPLE III

This was similar to Example II except that a different substrate web was used and press settings differed as follows:

1. The base web is woodchip paper, the chips being between two paper plies. The gross thickness (which is very irregular as some of the woodchips define a distinct relief surface to the base web) varies between about 0.51 mm to 0.89 mm. The paper thickness is 0.18 mm. The "emboss" depth is from 0.33 to 0.71 mm. The woodchips (14 in FIG. 2) are typically 3–7 mm long by 1–2 mm wide by 0.25–0.76 mm thick.

2. The gap between the counter roller and dummy screen of the printing press is 0.76 mm.

3. The counter roller height is −3 mm.
4. The squeegee is set at 43° with 12 pressure.
5. The speed of print is 8.2 meters/minute.

After printing (the same pattern as Example I) and foaming the overall thickness was of the order of 2.9 mm, the substrate substance was 121 g/m², and the plastisol substance was about 277 g/m² of binder material. The appearance of the printed regions is blistered and textured to give a very pleasing irregular matt chunky effect. A peelable wallcovering was provided, the woodchip serving not only to influence the quality of the foam but also adding peelability.

The wallcovering of FIG. 1 is not made in accordance with the invention. The wallcovering of FIG. 2 is. The noticeable difference between the two coverings is that the FIG. 2 wallcovering has a greater thickness, a pronounced relief appearance and a much greater (3 times about) foam (plastisol) substance.

It is seen from the Examples and the drawing that the use of relief surface woodchip paper in conjunction with a rotary screen printing press can produce a quite different product from that obtained when using a flat paper. Whilst the reason for this has not yet been fully explored it is believed that there is co-ordination between the screen of the press and the woodchips which are in relief on the substrate. These woodchips keep the screen of the printing press set back from the substrate whilst nevertheless giving adequate physical support to the screen. This allows a greater flow of plastisol through the screen of the press whilst at the same time giving lateral support to the printed plastisol.

If the same set back of the screen is attempted with plain paper then a severe loss of pattern follows with tail off at the pattern edges and other unacceptable distortions.

What is claimed is:

1. A flexible wallcovering comprising a woodchip paper substrate having a coating of a foamed polymeric composition thereon.

2. A wallcovering as claimed in claim 1 in which the substrate has 20–35% by weight of woodchips some of which provide a relief on at least one surface thereof and the foamed polymeric composition is on said surface and has both a blistered and textured appearance.

3. A wallcovering as claimed in claim 2 in which the substrate has two plies with woodchips in between the plies.

4. A method of making a flexible wallcovering comprising a substrate having a coating of a foamed thermoplastic polymeric composition thereon characterised in that the substrate is a woodchip paper chosen to have a relief surface defined by woodchips and in that a foamable composition having a binder is applied to said relief surface by a screen printing process and then heated to cause the composition to foam.

5. A method of making a wallcovering according to claim 4 in which the woodchips defining the relief surface have an average maximum dimension of at least 2 mm and form 20 to 35% by weight of the paper.

6. A method of making a wallcovering according to claim 5 in which the average length of the woodchips is at least twice the average width and twice the average thickness.

7. A method making a wallcovering according to claim 4 in which, in the areas to which the foamable composition is applied, the amount of binder material applied is at least 90 g/m².

8. A method of making a wallcovering according to claim 4 in which the substrate is given an overall protection coat before applying the foamable composition.

* * * * *